July 31, 1945. V. DE SAMSONOW 2,380,635
MEANS FOR INDICATING AIRCRAFT FLIGHT CONDITION
Filed Sept. 5, 1942

15

INVENTOR
VASSILY de SAMSONOW
BY Victor D. Borst
ATTORNEY

Patented July 31, 1945

2,380,635

UNITED STATES PATENT OFFICE 2,380,635

MEANS FOR INDICATING AIRCRAFT FLIGHT CONDITION

Vassily de Samsonow, Ponca City, Okla.

Application September 5, 1942, Serial No. 457,433

6 Claims. (Cl. 73—178)

This invention relates to means for indicating the flight condition of air planes, especially to warn the pilot by either an audible or visual signal of a stall condition and to give an indication of correct glide conditions.

The angle and speed of attack of the wings of a plane relative to the air determines the lift component of the force developed. Since it is the lift component which counteracts gravity the plane will fall when that component becomes less than gravity. The lift force is produced by the combination of a negative pressure on top of the wing and a positive pressure on the bottom, and it is necessary in order to avoid a stall condition, that is, a condition where the lift component is insufficient to support the plane, to keep the areas of negative and positive pressures properly disposed and separate. The speed and attitude of the wings are therefore both factors of the flight condition, and it requires less speed to keep the centers of pressure on the wings correctly disposed when flying straight ahead at the proper angle of attack, than when climbing or banking. The pressures at points on the airfoil surfaces are a function of the speed and angle of attack. Therefore if this pressure be known it will be an indication of the flight condition.

According to this invention, therefore, means are provided to compare the dynamic pressures at selected points on the airfoil surfaces with a predetermined minimum pressure, and to indicate the result of the comparison.

I am aware that differential devices of this general character have been employed to compare a static pressure with a dynamic pressure obtained by a device in the nature of a Pitot tube, and utilize the difference in pressure to indicate the speed of a craft. While my invention utilizes that general principle, its purpose is to embody it in sufficiently flexible form to adapt it for use in connection with air planes each of which has its own individual characteristics which vary with different load conditions.

Moreover it is elemental that flight conditions vary with changes in altitude, more speed being required to develop sufficient lifting force as the air becomes less dense. This is automatically taken care of in accordance with this invention because the minimum value of the comparing or reference pressure remains constant irrespective of the elevation, and, since the compared pressure is a function of the speed, it will be necessary to increase the speed with the elevation to keep the indication in the safety range.

The differential or comparing device is suitably a casing divided into two chambers by a diaphragm on one side of which is the predetermined minimum pressure and on the other side the variable pressure. Preferably the chamber the pressure in which is compared will be connected with two widely separated orifices, for example, one on each wing, so that the pressure will be the average of the two points. The reference pressure, that is, that on the opposite side of the diaphragm, must be at or above the predetermined minimum value as determined by the spring loading, and should exceed the minimum or stall condition pressure on the first side.

It is suitable therefore to employ a reducing or regulating valve in the line providing the reference pressure which may be variably set to give a desired minimum pressure.

If desired a second indicating instrument may be provided adjacent the first and similarly connected with pressure orifices to indicate glide condition. The comparing or reference pressure may be supplied by an independent line from a separate pressure orifice as shown, in which case the regulating valve will have its individual setting to give the proper comparing pressure.

In order to make the device useful to indicate stalled condition in very steep turns, it is contemplated that a gyroscopic turn indicator will be connected to open the bleeding valve so as to reduce the compared pressure and thus cause the danger signal to be displayed at a greater airfoil surface pressure during very steep turns than when in normal flight.

The invention includes other features which will appear from the following description of the illustrated embodiment of the invention.

Figure 1:
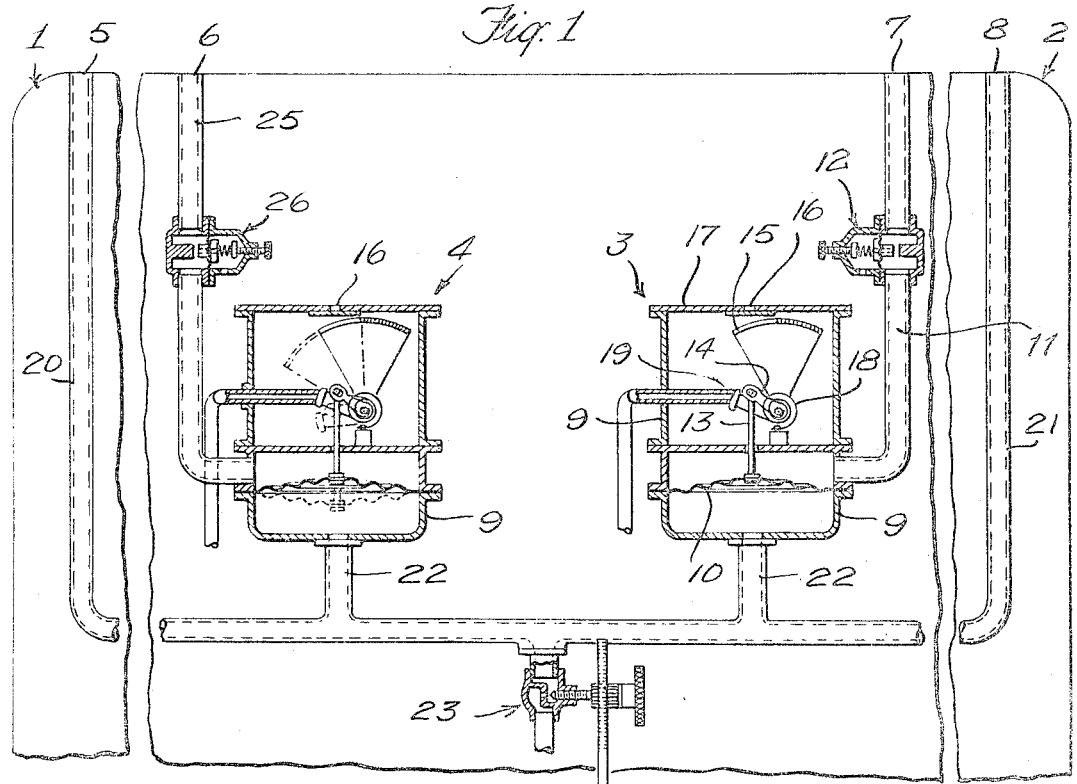
Fig. 1 is a diagrammatic representation of an embodiment of the invention as applied to an air plane, parts being broken away.
Figure 2:
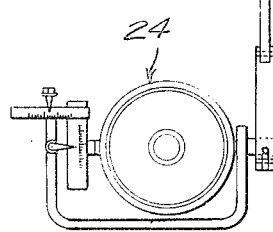
Fig. 2 is a detail in plan of the instruments showing the relation of the indicators to the windows.
Figure 2:
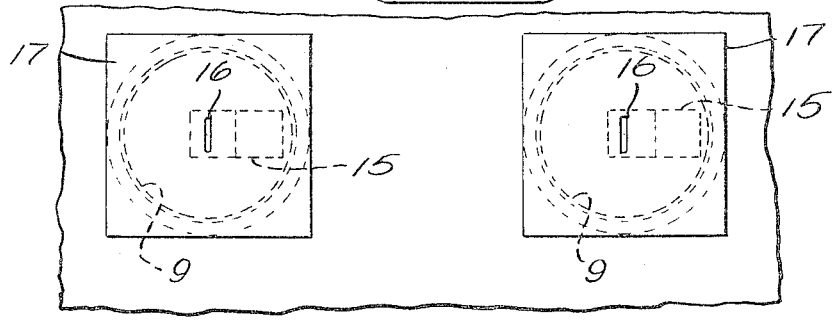

The parts 1 and 2 may well be considered portions of the two wings of an air plane with the instruments 3 and 4 located in the fuselage within view of the pilot. Openings 5, 6, 7 and 8 are pressure orifices on an airfoil surface, such as the leading edge of the wings. These openings are connected by tubes to the differential devices as will be described. These devices as shown are substantially identical. Reference will first be made to device 3.

Clamped between the two halves of the casing 3 is a diaphragm 10. The upper chamber so formed is connected to the opening 7 by tube 11. There is a pressure regulating valve 12 in this tube. This valve is of any well known construction. The setting of a screw stem regulates the tension of a spring which controls a diaphragm controlling a valve. The pressure of the air which is required to flex the diaphragm against the force of the spring and thus open the valve determines the minimum pressure on top of the diaphragm 10. That pressure may be varied by turning the hand wheel on the valve 12. This pressure on the upper side of the diaphragm is the reference pressure and will not fall below the minimum pressure corresponding to the setting of the valve 12.

A stem 13 on the diaphragm extends through the top of the casing and is connected to an arm 14 which operates an indicator 15 that shows through a window 16 in a cover plate 17 supported on top of the differential device. A light spring 18 weakly biases the indicator in one direction so as to take up backlash.

The indicator has two indications one of which is non-stall and the other stall condition. The diaphragm stays in one position until the pressure in the opposite direction predominates, whereupon the diaphragm flexes to the opposite extreme and produces the other indication. In other words all indications are of a positive nature.

Figure 3:
Fig. 3 is a detail in plan of one of the indicators.

The indicator strip 15 may be one half red and one half green, as shown in Fig. 3. The window 16 is so located that in one position of the diaphragm one color shows and in the other position the other color shows.

There may be a slight leakage of air around the opening for the stem 13 into the indicator compartment without causing the device to be inaccurate, and this reference pressure source may be utilized to operate an audible signal such as a whistle 19 when the diaphragm is flexed down and the indicator is on red.

The lower chamber of the casing 9 communicates with pressure openings 8 and 9 through tubes 20 and 21 and connect with a common inlet tube 22 the pressure in which will be the average of that in the two tubes. The value of this pressure is controlled by a needle valve 23 located near the junction of tubes 20 and 21. There will be a leakage through this needle valve an amount depending upon the setting of the valve which will insure that a stall condition will be indicated. At stall condition the reference pressure must exceed the compared pressure, and the safe or maneuverable speed depends upon the load and other conditions. The valves 12 and 23 will be set accordingly.

On banks the pressures at 8 and 9 will vary and there is then a flow from one opening to the other but this does not affect the pressure registered on the lower chamber because air is constantly bled off through valve 23. Since the air is at all times escaping through the needle valve 23 under flight conditions, there is a constant flow through the tubes 20 and 21 which has the beneficial effect of removing condensation, as well as that of making a slight correction for difference in velocity of the wings during a turn.

For reasons above mentioned the ratio of the differential pressures should be modified on steep banks to prevent getting into a stall. This may be taken care of by connecting a gyroscopic turn device so as to change the exhaust rate through the bleed valve 23. Such utilization of a turn indicator is suggested in Fig. 1, in which a turn indicator 24, such for example as that shown in the Henderson Patent No. 1,900,709, is connected by suitable linkage to operate the valve 23.

The instrument 4 may be used in conjunction with the instrument 2 to indicate glide conditions. It is connected into the line connecting the openings 8 and 9 at approximately the junction of tubes 20 and 21, and since the reference pressure will have to be different from that in instrument 2, the upper chamber may be independently connected to an opening 6 by a line 25 having its own relief valve 26, as shown.

It is obvious that various modifications may be made in the construction as illustrated and above described within the principle and scope of the invention as pointed out in the following claims.

I claim:

1. Means for indicating aircraft flight condition comprising a casing having a movable member positionable by the relative pressures upon its opposite sides, means for developing upon one side of said member a pressure which is at or above a predetermined minimum pressure which is independent of changes in operating conditions, a pressure tube leading into the casing on the opposite side of the member and having its open pressure end exposed at an airfoil surface to develop a dynamic pressure which is a function of the speed of the aircraft and becomes less than said minimum pressure just prior to stall conditions, adjustable valve means in the tube providing a variable leakage opening for the air to regulate the dynamic pressure, and an indicator operated by the movement of the member.

2. Means for indicating aircraft flight condition comprising a casing having a movable member positionable by the relative pressures upon its opposite sides, two pressure tubes each having its open pressure end exposed at an airfoil surface at a position to develop a dynamic pressure which falls below a predetermined minimum value just prior to stall conditions and the tubes leading into the casing on opposite sides of the member, a pressure regulating valve in one tube settable to maintain a pressure on its side of the member which is at or above said predetermined minimum pressure irrespective of changes in operating conditions, adjustable valve means in the other tube providing a variable leakage opening for the air to regulate the dynamic pressure, and an indicator operated by the movement of the member.

3. Means for indicating aircraft flight condition comprising means forming two substantially spaced pressure openings on airfoil surfaces positioned to develop a dynamic pressure which falls below a predetermined minimum value just prior to stall conditions, a casing disposed substantially midway between the openings, a flexible diaphragm mounted in the casing, means for developing a pressure in the casing upon one side of the diaphragm which is at or above said predetermined minimum pressure, two tubes of substantially equal length leading from the respective openings and communicating with a common inlet into the casing on the other side of the diaphragm, adjustable valve means adjacent the junction of the two tubes providing a variable leakage opening, and an indicator connected to the diaphragm to be operated thereby.

4. Means for indicating aircraft flight condition comprising means forming two substantially spaced pressure openings on airfoil surfaces positioned to develop a dynamic pressure which falls below a predetermined minimum value just prior to stall conditions, a casing disposed substantially midway between the openings, a flexible diaphragm mounted in the casing, two tubes of substantially equal length leading from the respective openings and communicating with a common inlet into the casing on one side of the diaphragm, adjustable valve means adjacent the junction of the two tubes providing a variable leakage opening to control the dynamic pressure, means forming a third pressure opening on an airfoil surface, a third tube leading from the third opening to the casing on the opposite side of the diaphragm, a regulating pressure valve in the third tube to maintain pressure on said last side of said diaphragm which is at or above said predetermined minimum pressure, and an indicator connected to the diaphragm to be operated thereby.

5. Means for indicating aircraft flight condition comprising a casing having a movable member positionable by the relative pressures upon its opposite sides, means for developing a pressure upon one side of the member which is at or above a predetermined minimum pressure, a pressure tube leading into the casing on the opposite side of the member and having its open pressure end exposed at an airfoil surface to develop on the opposite side of the member a dynamic pressure which is a function of the speed of the aircraft and becomes less than said minimum just prior to stall conditions, adjustable valve means in the tube providing a variable leakage opening for the air to regulate the dynamic pressure, means responsive to the rate of turning of the aircraft operative to modify the pressure on one side of the diaphragm, and an indicator operated by the movement of the member.

6. Means for indicating aircraft flight condition comprising means forming two substantially spaced pressure openings on airfoil surfaces positioned to develop a dynamic pressure which falls below a predetermined minimum value just prior to stall conditions, a casing disposed substantially midway between the openings, a flexible diaphragm mounted in the casing, two tubes of substantially equal length leading from the respective openings and communicating with a common inlet into the casing on one side of the diaphragm, adjustable valve means adjacent the junction of the two tubes providing a variable leakage opening, means forming a third pressure opening on an airfoil surface, a third tube leading from the third opening to the casing on the opposite side of the diaphragm, a regulating pressure valve in the third tube to maintain a pressure on said last side of said diaphragm which is at or above said predetermined minimum pressure, means responsive to the rate of turning of the aircraft operative to modify the pressure on one side of the diaphragm, and an indicator connected to the diaphragm to be operated thereby.

VASSILY DE SAMSONOW.